No. 870,044.  
PATENTED NOV. 5, 1907.  
D. NETTENSTROM.  
BELT AND BELTING.  
APPLICATION FILED SEPT. 29, 1906.
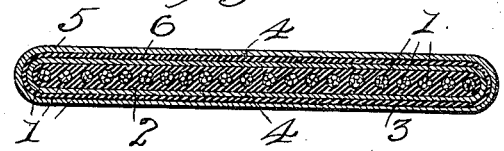
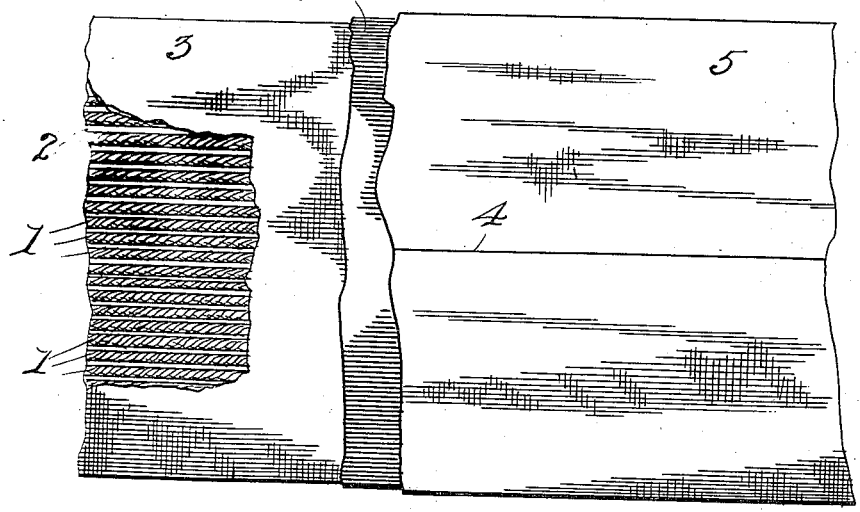
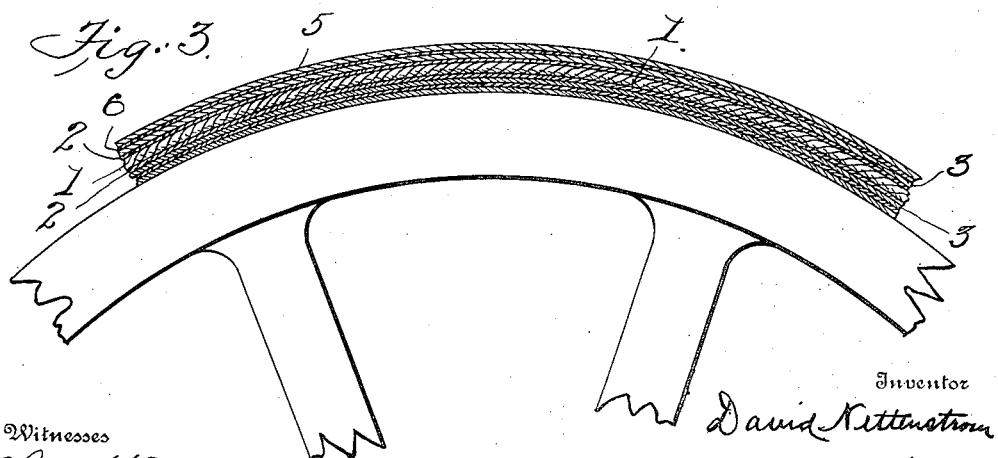

UNITED STATES PATENT OFFICE.

DAVID NETTENSTROM, OF CHICAGO, ILLINOIS, ASSIGNOR TO U. S. CHEMICAL RUBBER COMPANY, OF CHICAGO, ILLINOIS, A CORPORATION OF THE DISTRICT OF COLUMBIA.

BELT AND BELTING.

No. 870,044.  Specification of Letters Patent.  Patented Nov. 5, 1907.

Application filed September 29, 1906. Serial No. 336,783.

*To all whom it may concern:*

Be it known that I, DAVID NETTENSTROM, a citizen of the United States, residing at city of Chicago, in the county of Cook and State of Illinois, have invented certain new and useful Improvements in Belts and Belting, of which the following is a specification.

The present invention relates to improvements in belts and has for its objects the provision of a belt having its central portion so constructed that, under normal conditions the center of the belt which receives the strain or pull, will not be materially stretched or lengthened; the outer portions of the belt being so constructed that when passing around a pulley or wheel the portion of the belt remote from the periphery of the wheel may expand lengthwise or stretch, while the inner portion of the belt which is in frictional contact with the surface of the pulley, may be contracted lengthwise; thus insuring an effective frictional contact between the belt and pulley. The pliability of the belt thus characterized will increase the efficiency thereof and especially adapt the belt for use on high speed machinery. By the employment of a substantially non-elastic center for the belt and providing an elastic or pliable material for the outer portion of the belt, the strain or pull on the belt is confined to the central portion thereof without wear, and the wear on the outer portion of the belt without strain to that portion, thus increasing the life, wear, and durability of the belt.

With these objects in view, the invention consists in certain novel features of constructions and combinations as hereinafter pointed out in the specification and more clearly defined in the claims.

In the accompanying drawings I have illustrated one example of the physical embodiment of the invention, constructed according to the best mode I have so far devised for the practical application of the principles of the invention.

Referring to the drawings, Figure 1 is a cross section of a belt embodying the features of the present invention. Fig. 2 is a top plan view of a portion of the belt of Fig. 1, portions of the same being torn away to expose the laminations of the belt for clearer illustration, and Fig. 3 represents a section of the belt applied to a wheel or pulley, illustrating the conditions of the inner side, the central portion, and the outer side of the belt.

In the construction of the belt I use a suitable number of cords or strands 1, which form the warp or center of the belt. These cords may be of the desired size and strength to meet the requirements in accordance with the power of the belt desired. Preferably these cords are of linen, but I may utilize strands or cords of cotton for instance, or other suitable material may be employed for the cord center, provided the same be substantially non-elastic. These cords or strands 1 are laid side by side, extend the entire length of the belt, and are held together by a coating or mass of elastic cement, as indicated at 2. This material 2 may be of rubber compound or other adhesive cement, which will incase each strand of the belt center separately and entirely surround the same.

Around the incasing mass or coating 2, a textile layer 3, is folded, the material 2 forming a cementing agent between the strands of the center and the textile layer 3. This layer of textile fabric is preferably composed of canvas, and has its edges folded around, as at 4, to meet in the longitudinal center of the flat belt. As illustrated in the drawings, a second canvas, or other textile covering 5, is folded around the layer or cover 3, and an adhesive elastic mass, as 6, holds the two layers together. As many successive canvas layers or covers as desired may be used, with the adhesive mass between, and each cover or layer is folded around the preceding one so that the joint 4 in the last cover will be on the side of the belt opposite the former joint, thus increasing the compactness and strength of the belt as a whole.

It will be understood that the strands 1 are not woven or knit, but are effectively held together by the adhesive compound or cement. The adhesive cement may be of any desirable and suitable material, and the layers of textile material are preferably of canvas, but it will be evident that other suitable material may be used if desired.

The center of the belt is substantially inelastic and is sufficiently strong to take up the pull or strain when passing over a wheel or pulley, thus relieving the outer elastic portions of the belt of strain, and permitting the canvas and coating to act as a cushion between the center strands of the belt and the pulley or wheel, the outer portion of the belt or that portion remote from the wheel, stretching, the inner portion or strands taking the strain without substantial expansion, and the inner elastic portion in contact with the wheel adapting itself to the wheel with a close frictional contact.

A belt thus constructed and as described, is exceedingly strong, pliable, and durable, and fulfils the conditions set forth as the purpose of the invention.

Having thus fully described my invention, what I claim as new and desire to secure by Letters Patent is:

1. A belt having its interior portion composed of inelastic cords forming a warp to take the strain of work, an adhesive and elastic casing surrounding said cords, a flexible covering surrounding said casing, a second similar adhesive and elastic casing over said covering, and an outer flexible covering for the belt, the joints of said flexible coverings being located on opposite sides of the belt.

2. A belt comprising a central portion composed of strands extending the length of the belt and side by side, adhesive elastic material surrounding said strands, a canvas covering around said material, a second similar material, and a second canvas covering, the joints of said canvas coverings being located on opposite sides of the belt.

In testimony whereof I have signed my name to this specification in the presence of two subscribing witnesses.

DAVID NETTENSTROM.

Witnesses:
ALBERT WILLIAM EDER,
HORACE L. WALKER.